United States Patent
Fuchs

(10) Patent No.: US 12,480,472 B2
(45) Date of Patent: Nov. 25, 2025

(54) METHOD FOR OPERATING A WIND TURBINE AS WELL AS WIND TURBINE CONTROLLER FOR IMPLEMENTING THE METHOD

(71) Applicant: Wobben Properties GmbH, Aurich (DE)

(72) Inventor: Andreas Fuchs, Hanerau-Hademarschen (DE)

(73) Assignee: Wobben Properties GmbH, Aurich (DE)

( * ) Notice: Subject to any disclaimer, the term of this patent is extended or adjusted under 35 U.S.C. 154(b) by 242 days.

(21) Appl. No.: 18/066,225

(22) Filed: Dec. 14, 2022

(65) Prior Publication Data

US 2023/0184217 A1 Jun. 15, 2023

(30) Foreign Application Priority Data

Dec. 15, 2021 (EP) .................................. 21214730

(51) Int. Cl.
*F03D 7/04* (2006.01)

(52) U.S. Cl.
CPC ........ *F03D 7/047* (2013.01); *F05B 2270/504* (2013.01)

(58) Field of Classification Search
CPC ..................................................... F03D 7/047
See application file for complete search history.

(56) References Cited

U.S. PATENT DOCUMENTS

| 2017/0227944 A1 | 8/2017 | Goli et al. |
| 2018/0163701 A1 | 6/2018 | Kuppagadde Sheshadri Rao |
| 2018/0266392 A1* | 9/2018 | Hovgaard ............... F03D 7/045 |

FOREIGN PATENT DOCUMENTS

| EP | 3206097 A1 | 8/2017 |
| EP | 3336349 A1 | 6/2018 |

* cited by examiner

*Primary Examiner* — Aaron R Eastman
(74) *Attorney, Agent, or Firm* — Seed Intellectual Property Law Group LLP

(57) ABSTRACT

The disclosure relates to a method for operating a wind turbine. The method comprises providing several software modules as an operating software for operating the wind turbine, wherein the software modules each have at least one communications input and/or at least one communications output, as well as providing a configuration list with several entries, wherein the entries assign to a respective communications input of a software module a communications output of another software module. For each entry, the method further comprises transmitting information of the respective entry to a software module of the software modules with at least one communications input which allows the software module to access data of the communications output of another software module, which in the entry is assigned to the communications input, and operating the wind turbine with the software modules. The disclosure further relates to a computer program product, a wind turbine controller for a wind turbine, and a wind turbine with a controller.

15 Claims, 3 Drawing Sheets

METHOD FOR OPERATING A WIND TURBINE AS WELL AS WIND TURBINE CONTROLLER FOR IMPLEMENTING THE METHOD

BACKGROUND

Technical Field

The invention relates to the area of wind turbines, and here in particular to the control of wind turbines.

Description of the Related Art

As known from prior art, a wind turbine, if organized in a wind farm, has its own wind turbine controller, which is also referred to below as controller for short. For example, the controller can be used to independently detect prevailing wind conditions, and the operation of the wind turbine can be controlled or regulated as a function of these wind conditions. In the case of a wind farm, such control or regulation tasks are partially outsourced to wind farm regulators, wherein the wind turbine itself cannot do without a controller, for example so as to enable an operation individual to the wind turbine. Safety reasons also dictate that a controller of a wind turbine be present, in order to safely regulate a wind turbine again or bring it into a safe condition given a communications failure with a wind farm regulator.

The controller of a wind turbine is here based upon an operating software that can execute various operating modes and/or operating functions. The operating modes or operating functions are selected in the operating software, for example via a sensor system or operator specifications. The operating modes or operating functions are here basically provided in such a way that the wind turbine can operate over its entire service life.

For example, a wind turbine has thus far often been designed for a typical service life of about 25 to 30 years, and load models were defined for the wind turbine, to which the operating modes and operating functions were oriented so as to reach this service life. This enabled an operation of the wind turbines in which the wind turbine could be suitably operated, predetermined by remunerations that as a rule were contractually fixed over essentially the entire service life.

However, the framework conditions have recently been increasingly changing over the course of the service life of a wind turbine. Such changing framework conditions comprise political decisions as to remuneration, increasingly stringent environmental regulations, changing developments in surrounding area, and increasing requirements by the network operator. The individual changing framework conditions are in part directly interrelated. For example, new network support tasks are rewarded with an adjusted remuneration when achieved through operation.

In order to adjust the operation of the wind turbine for these changing framework conditions with changing or additional operating modes or operating functions, it is often enough to update the operating software, although an adjustment of the operating hardware is also required in part. For example, a hardware component used for optimizing a specific operating mode might not be suitable for realizing a new operating mode, or only an inefficient operation can be ensured in the modified operating mode, for example. The hardware must be modified in such a case. As a rule, this only relates to individual components, so that retrofitting the wind turbine is initially justifiable from an economic standpoint. However, adjusting or replacing a hardware component usually also requires a completely new operating software that is adjusted to the modified component.

However, safety aspects alone dictate that an operating software be certified in the area of wind turbines, as also the case for other highly automated, essentially independently operating systems. Among other things, comprehensive tests on the operating software are required for this purpose. The certification process is therefore very lengthy, and thus costly, so that any flexibility while adjusting the hardware of a wind turbine is indirectly reduced by a large outlay for adjusting the operating software.

BRIEF SUMMARY

Provided are methods of operation to be made more flexibly adjustable, in particular given a change in hardware or rewiring of existing hardware components. In any event, an alternative to what is known from prior art is to be proposed.

Provided is a method for operating a wind turbine. The method comprises providing several software modules as the operating software for operating the wind turbine. Each of the software modules have at least one communications input and/or at least one communications output. A software module is preferably used to perform a partial task or complete task involved in operating the wind turbine. The software modules receive data from other software modules via their communications input during the operation of the wind turbine, and process this data based upon their partial task, so as to again output processed data at the communications output after processing is complete.

According to one aspect of the method, a configuration list with several entries is further provided. The entries assign to the respective communications input of a software module a communications output of another software module. Therefore, the configuration list provides a common list for all software modules, in order to specify how the respective communications inputs and communications outputs of the software modules are to be interconnected.

According to another aspect of the method, the entries on the configuration list are used in an additional step to transfer respective information for each entry to a software module of the software modules with at least one communications input, which allows this software module to access data of the communications output of another software module, which in the entry is assigned to the communications input. Therefore, this step involves identifying a software module with a communications input for each entry based upon the entry on the configuration list, wherein information is transmitted to the identified software module, allowing it to access the communications output(s) of other software modules assigned in the same entry, so as to obtain data for their communications input.

In the ensuing step, the wind turbine is then operated with the software modules. This means that, preferably after the information from each of the entries on the configuration list has been transmitted to the corresponding software modules, wiring of the software modules has concluded. The software modules can then communicate with each other independently of the configuration list, so that the wind turbine can be operated with the software modules without the configuration list.

Consequently, the configuration list is used to organize communication between the software modules. If individual software modules, for example those provided for controlling a specific hardware component, are replaced, it is enough to verify this individual software module which was assigned to the new component to ensure flawless operation.

In this way, just adjusting the configuration list makes it possible to integrate new software modules into an inventory of multiple unmodified software modules, and thereby easily create completely new operating modes. This is already also possible by interconnecting communications inputs and communications outputs differently, for example. Individual new or changing software modules can be integrated solely via the configuration list. As a consequence, all software modules no longer have to be adjusted to a single modified or added software module.

As a result, there is an increased flexibility of an operating software, and thus of an adjusted operation, with respect to changing framework conditions of operating a wind turbine.

According to a first embodiment, the steps mentioned above, aside from operating the wind turbine with the software modules, specifically providing the software modules, providing the configuration list, and transmitting information after activating a controller of the wind turbine, are performed one time. Activation here preferably comprises switching on or restarting the controller of the wind turbine. Therefore, a change in the operating software configuration is possible with each activation of the controller, i.e., in particular a booting of the operating software. By contrast, information on the configuration list can no longer be modified after a restart once transmitted to the software modules until another restart takes place. In this respect, it is ensured that no change in operating software configuration is possible during an ongoing operation of the wind turbine, as this could lead to unsafe operating conditions.

According to another embodiment, an identifier is assigned to each communications output. The identifier preferably comprises an address or comparable data, which make it possible to access the communications output. According to this embodiment, information sent to the software modules with the communications inputs based upon the configuration list comprises the identifier of the respective communications output assigned via the respective entry. As a result, each software module with a communications input can have clear access to data of the communications output of another software module, since the communications outputs are clearly marked by the identifier. The communications outputs can thus be easily assigned to communications inputs of other software modules.

According to another embodiment, a variable is assigned to each of the communications outputs. These variables can also be referred to as a symbol. Output data of a communications output are provided in the assigned variable. The variable thus contains the data of the communications output, to which the identifier is simultaneously assigned. Accordingly, the communications output provides its data in the variable, which can then be retrieved by a software module that knows the identifier assigned to the communications output, i.e., in particular to the variable. The communications output hence preferably comprises a memory location that can be referred to as a variable, and in which output data are stored. The address of this memory location is viewed as an identifier, for example. Therefore, the data of a communications output can easily be retrieved by several communications inputs by having them access the communications output from the variable which can be accessed by the identifier.

According to another embodiment, at least one communications input set up to receive control signals is set up to send data back to the assigned communications output. These data preferably comprise a receipt confirmation, in particular in a case where data retrieved by the communications input comprise control commands.

Accordingly, a communications input preferably uses an identifier to retrieve a control command from a variable, i.e., a symbol, of a communications output of another software module. If a control command was then received by the control module and preferably tested as plausible, the communications output uses the identifier known to it to return data preferably comprising only one receipt confirmation of the control signal to the communications output. In this way, a check can be performed in the software module that provides the control command or other data to verify that the provided control commands or data were also retrieved by the expected software modules.

According to another embodiment, the method comprises an initialization phase. In the initialization phase, which preferably takes place before the information is transmitted to the software modules, all software modules having at least one communications output report the identifier(s) of their communications output(s) to a central software module. In particular, the identifiers of the variables assigned to the communications output are thus reported to the central software module. The configuration list is preferably also stored in the central software module, or newly stored therein after an update. The initialization phase preferably also takes place one time after activating a controller of the wind turbine. The identifiers can preferably be designed as pointers, which point to the variable of the correspondingly assigned communications output, and thus directly provide variable data through integration into one of the other software modules.

During the activation of a wind turbine controller, the initialization phase initially informs the central software module which communications outputs are even provided in the operating software, so that the central software module can correspondingly interconnect or distribute the data of these outputs to other software modules based upon the configuration list. In particular, this makes it possible to detect communications outputs that are missing, i.e., that are expected based upon the configuration list but not disclosed.

According to another embodiment, the method comprises an initialization completion phase. The initialization completion phase preferably follows the initialization phase. In the initialization completion phase, all software modules having at least one communications input retrieve the identifier from the central software module, which is assigned in the accompanying entry. After retrieved, the identifier is then stored in the respective software module that retrieved the identifier. As a consequence, a data exchange between the software modules can take place after the initialization completion phase, even without the central software module and the configuration list.

According to another embodiment, the initialization completion phase is performed after the initialization phase. The initialization phase is performed once all software modules having at least one communications output have notified the central software module that they have disclosed their identifiers. This ensures that the initialization completion phase is not performed before all software modules have provided their communications outputs. This is because, if identifiers of specific communications outputs have not yet been reported to the central software module, an error would arise and be marked during the assignment based on the configuration list, but is one that can be avoided.

According to another embodiment, a software module notifies the central software module in the initialization completion phase if its communications input is assigned an identifier that does not correspond to any communications output. Alternatively, a software module also notifies a central software module if the configuration list contains no entry that assigns an identifier to the communications input. This ensures that all communications inputs can also receive data. A malfunction caused by undefined values at an unassigned data input is avoided in this way.

According to another embodiment, the data are retrieved cyclically for several or all software modules and/or at the request of a software module for several or all software modules. In other words, the data of the assigned communications outputs are retrieved simultaneously by several or all software inputs in a clock- or event-based manner. This ensures that different software modules which access the data of the same communications output receive identical values at a retrieval time. A deterministic behavior of the software is ensured in this way.

Provided according to another embodiment is a single software module of the operating software, which can also be referred to as an interface software module. The interface software module provides an interface between the operating software and a hardware of the wind turbine. The interface software module is used to provide all hardware inputs as corresponding communications inputs and all hardware outputs as corresponding communications outputs of the single software module. As a consequence, the components can be centrally retrieved or actuated via this software module, which provides a single interface between the remaining software modules and the hardware of a wind turbine. For example, in the case of newly provided hardware, it is possible for the entire operating software to access the new hardware just by adjusting this interface software module. Executing software modules, for example which regulate or control the wind turbine, need thus not be modified, even if they are intended to access modified hardware components. Only the modified interface software module must thus be retested and verified. Such a test is comparatively easier to perform on a software module designed as an interface than on a software module that executes a function or control.

The disclosure further comprises a computer program product comprising instructions which, when executed on a wind turbine controller, are set up to implement the method according to one of the aforementioned embodiments.

In addition, the disclosure comprises a wind turbine controller for a wind turbine. In particular if it comprises the aforementioned computer program product, the wind turbine controller is set up to implement the method according to one of the aforementioned embodiments.

In addition, the disclosure comprises a wind turbine with the controller according to the disclosure.

BRIEF DESCRIPTION OF THE SEVERAL VIEWS OF THE DRAWINGS

Additional embodiments may be gleaned based upon the exemplary embodiments described in more detail on the figures. Shown here on.

DETAILED DESCRIPTION

Figure 1:
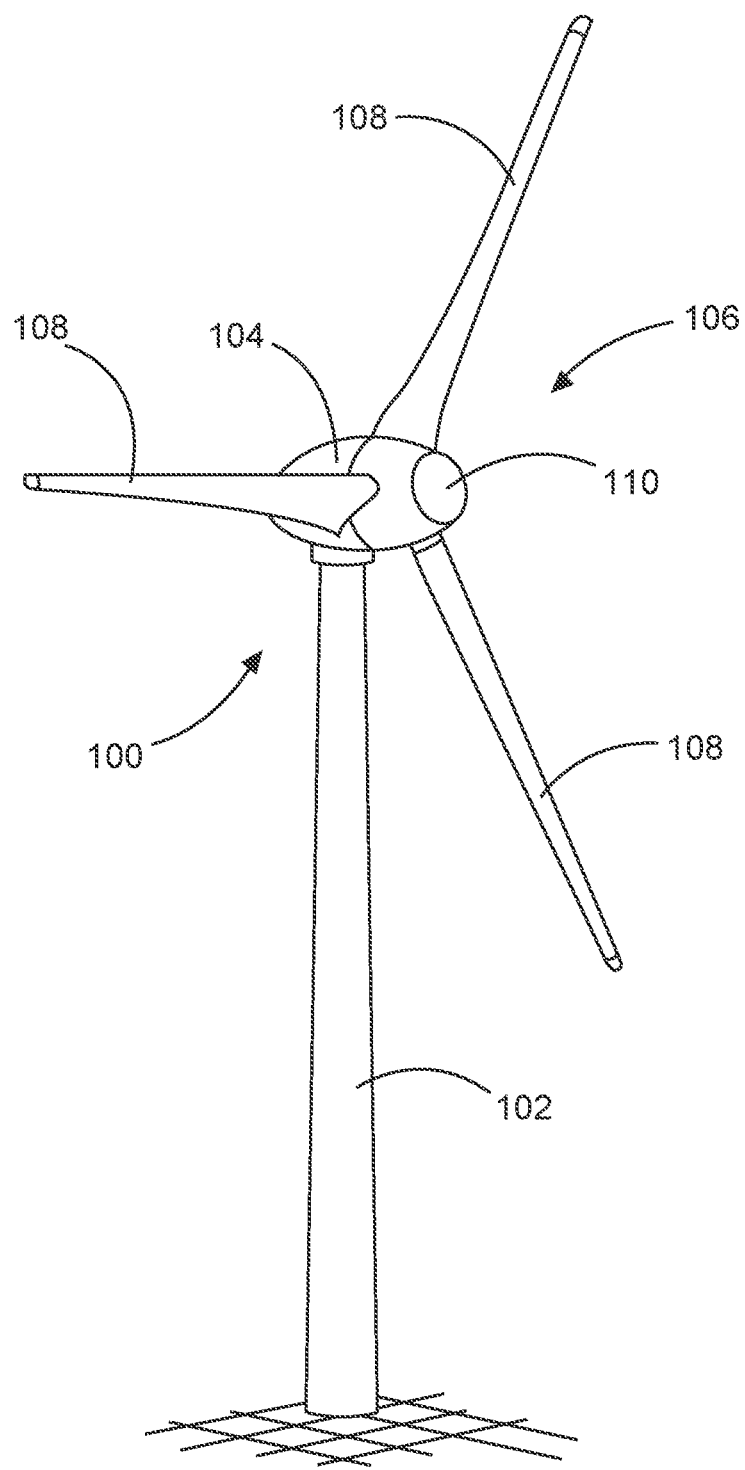
FIG. 1 is a wind turbine.

FIG. 1 shows a schematic view of a wind turbine 100 according to the disclosure. The wind turbine 100 has a tower 102 and a nacelle 104 on the tower 102. Provided on the nacelle 104 is an aerodynamic rotor 106 with three rotor blades 108 and a spinner 110. During operation of the wind turbine 100, the wind imparts a rotational motion to the aerodynamic rotor 106, which thus also turns an electrodynamic rotor or runner of a wind turbine generator, which is directly or indirectly coupled with the aerodynamic rotor 106. The electric wind turbine generator is arranged in the nacelle 104, and generates electric energy. The pitch angles of the rotor blades 108 can be changed by pitch motors on the rotor blade roots of the respective rotor blades 108.

Figure 2:
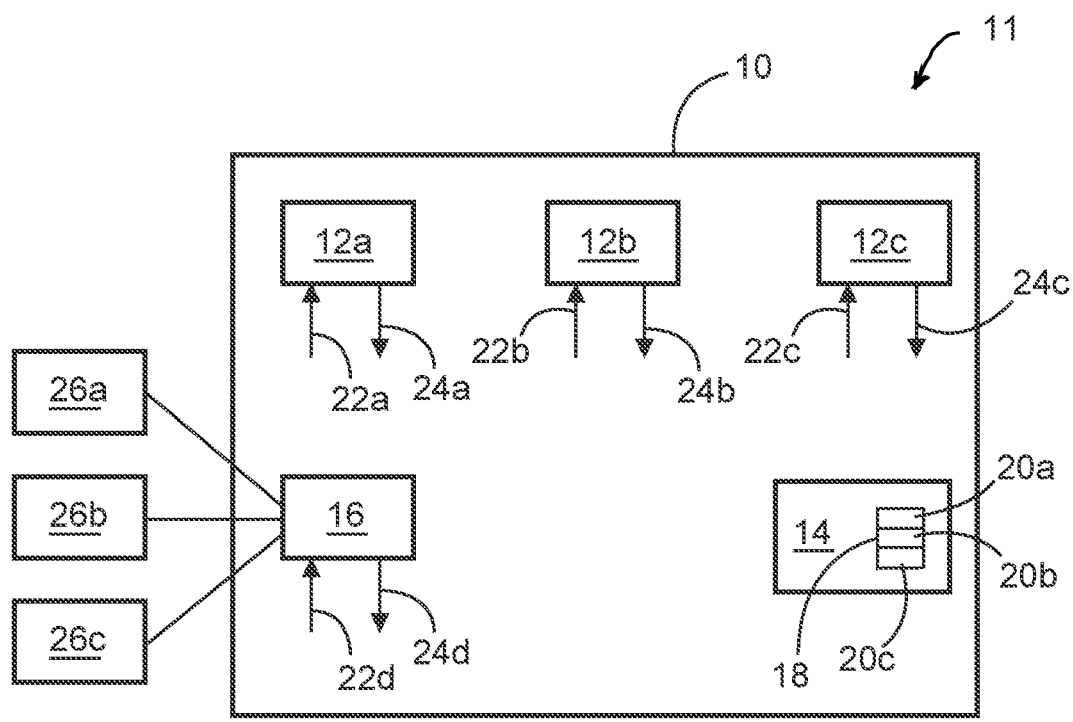
FIG. 2 is a structural design of an operating software according to the disclosure.

FIG. 2 shows a structural design of a memory storing operating software 10 of a controller 11, which according to one exemplary embodiment of the disclosure has a modular design. The operating software 10 comprises several software modules 12a, 12b, 12c, 16, and corresponds to a central software module 14 that has a configuration list 18. The configuration list 18 comprises entries 20a, 20b, 20c, with which communications inputs 22a, 22b, 22c of the software modules 12a, 12b, 12c, 16 and communications outputs 24a, 24b, 24c of the software modules 12a, 12b, 12c, 16 are connected with each other when activating or booting the operating software 10. The entries 20a, 20b, 20c are used to assign a respective one of the communications outputs 24a, 24b, 24c to each of the communications inputs 22a, 22b, 22c.

The software module 16 corresponding to an interface software module 16 also has at least one communications input 22d and at least one communications output 24d. The interface software module 16 is connected with hardware interfaces 26a, 26b, 26c of the wind turbine 100, for example which correspond to digital inputs, digital outputs, analog inputs, analog outputs, and connections to bus systems. The hardware interfaces 26a, 26b, 26c are provided by the interface software module 16 as communications inputs 22d or communications outputs 24d.

The software modules 12a, 12b, 12c are representative of a plurality of software modules 12a, 12b, 12c, which control or regulate individual components of the wind turbine 100, i.e., perform partial tasks involved in operating the wind turbine. For example, the software module 12a can be provided for processing weather data, and the module 12b for regulating the adjustment drives of the rotor blades 108, specifically for pitching. For example, the interface software module 16 can therefore be used to receive weather data, which must be supplied to the software module 12a, for example so as to determine wind parameters therefrom. These wind parameters must in turn be used in the software module 12b for regulating the angles of attack of the rotor blades 108. The rotor blades 108 are actuated once again by having the communications output 24b then send out corresponding control commands, specifically adjustment signals, to the rotor blade adjustment drives via the interface software module 16. According to the view on FIG. 1, the software modules or their communications inputs 22a, 22b, 22c, 22d and their communications outputs 24a, 24b, 24c, 24d are not wired in the basic state of the operating software 10, and can thus not perform the aforementioned regulation of the rotor blades 108. Only in the process of booting or initializing via the central software module 14 are the software modules 12a, 12b, 12c, 16 interconnected according to the entries 20a, 20b, 20c of the configuration list 18. This takes place based upon the method for operating a wind turbine shown on FIG. 3.

Figure 3:
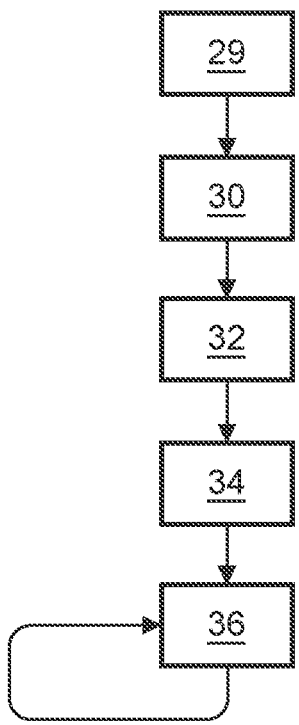
FIG. 3 are the steps of the method according to an exemplary embodiment.

Accordingly, FIG. 3 shows a method for operating a wind turbine 100. In a step 30 of the method, the several software modules 12a, 12b, 12c, 16 and a central software module 14 are provided as the operating software 10 for operating the wind turbine 100. The software modules 12a, 12b, 12c, 16 each comprise at least one communications input 22a, 22b, 22c, 22d and/or at least one communications output 24a, 24b, 24c, 24d. In step 32, a configuration list 18 with several entries 20a, 20b, 20c in the central software module 14 is provided. Each entry 20a, 20b, 20c here assigns a respective communications input 22a, 22b, 22c, 22d of a software module 12a, 12b, 12c, 16 to a communications output 24a, 24b, 24c, 24d of another software module 12a, 12b, 12c, 16.

In step 34, for each entry 20a, 20b, 20c, information of the respective entry 20a, 20b, 20c is sent to a software module 12a, 12b, 12c, 16 of the software modules 12a, 12b, 12c, 16 with at least one communications input 22a, 22b, 22c, 22d, which allows the software module 12a, 12b, 12c, 16 to access data of the communications output 24a, 24b, 24c, 24d of another software module 12a, 12b, 12c, 16, which in the entry 20a, 20b, 20c is assigned to the communications input 22a, 22b, 22c, 22d. In step 36, the wind turbine 100 is then operated with the software modules 12a, 12b, 12c, 16. Steps 30 to 34 are performed one time after activation in a step 29, wherein the wind turbine 100 is operated in step 36 until such time as the operating software 10 or the wind turbine 100 is turned off. According to one exemplary embodiment, step 34 is part of one of several phases, which are performed after step 32 while booting the operating software 10. These phases are shown on FIG. 4.

Figure 4:
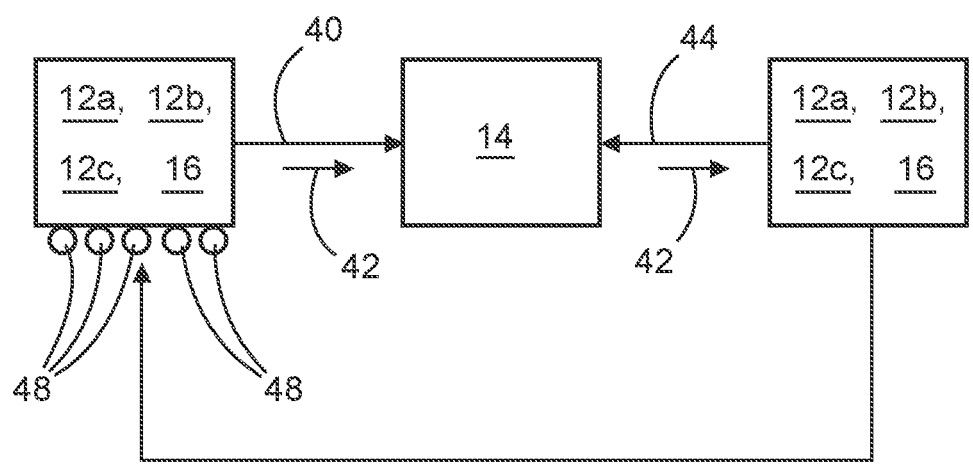
FIG. 4 are the phases of the method according to an exemplary embodiment.

FIG. 4 shows an initialization phase 40 in which all software modules 12a, 12b, 12c, 16 transmit identifiers 42 to the central software module 14, which each have assigned to them a communications output 24a, 24b, 24c, 24d. In a subsequent initialization completion phase 44, the identifiers 42 are then retrieved by the software modules 12a, 12b, 12c, 16 according to the configuration list 18. In each of the software modules 12a, 12b, 12c, the identifiers 42 are thus retrieved according to the configuration list 18, and assign a communications output 24a, 24b, 24c, 24d to a communications input 22a, 22b, 22c, 22d of a respective software module 12a, 12b, 12c, 16. These identifiers 42 are stored in the software modules 12a, 12b, 12c, 16, so that the software modules 12a, 12b, 12c, 16 can access the variables 48 assigned to the communications outputs 24a, 24b, 24c, 24d based upon the identifiers 42 in an ensuing operating phase 46. Accordingly, the software module 14 is no longer used in the operating phase 46.

REFERENCE LIST

10 Operating software
12a Software module
12b Software module
12c Software module
14 Central software module
16 Interface software module
18 Configuration list
20a Entry
20b Entry
20c Entry
22a Communications input
22b Communications input
22c Communications input
22d Communications input
24a Communications output
24b Communications output
24c Communications output
24d Communications output
26a Hardware interface
26b Hardware interface
26c Hardware interface
29 Activate
30 Provide software modules
32 Provide configuration list
34 Send information
36 Operate wind turbine
40 Initialization phase
42 Identifiers
44 Initialization completion phase
46 Operating phase
48 Variables
100 Wind turbine
102 Tower
104 Nacelle
106 Aerodynamic rotor
108 Rotor blades
110 Spinner The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for operating a wind turbine, comprising:
providing a plurality of software modules as an operating software for operating the wind turbine, wherein each of the plurality of software modules has at least one communications input and/or at least one communications output;
providing a configuration list with a plurality of entries, wherein each of the plurality of entries assigns to a respective communications input of a first software module of the plurality of software modules and a communications output of a second software module of the plurality of software modules;
for each respective entry of the plurality of entries, transmitting information of the respective entry to a respective software module of the plurality of software modules with at least one communications input, which allows the respective software module to access data of the communications output of another software module of the plurality of software modules, which in the entry is assigned to the communications input;
operating the wind turbine with the plurality of software modules;
adding a third software module to the plurality of software modules; and
adding an entry to the configuration list, wherein the entry assigns a respective communications input or a respective communications output of the third software module,
wherein the third software module replaces the second software module, and the method includes removing the second software module from the plurality of software modules in response to adding the third software module.

2. The method according to claim 1, wherein) the providing of the plurality of software modules, the providing of the configuration list, and the transmitting of the information for each respective entry of the plurality of entries are performed one time after activating a controller or wind turbine.

3. The method according to claim 1, wherein an identifier is assigned to at least each communications output, and the information comprises the respective identifier of the assigned communications output.

4. The method according to claim 3, wherein a variable is assigned to each communications output, and output data of a communications output are provided in the assigned variable, wherein one of the identifiers allows access to the provided content of the variable.

5. The method according to claim 1, wherein at least one communications input is configured to receive control signals and send data to the assigned communications output.

6. The method according to claim 1, comprising an initialization phase, in which all of the plurality of software modules having at least one communications output report the identifiers of the communications outputs, respective to a central software module.

7. The method according to claim 6, comprising an initialization completion phase, in which all of the plurality of software modules having at least one communications input retrieve the identifier from the central software module that is assigned in the accompanying entry, wherein, after retrieval, the identifier is stored in the respective software module that retrieved the identifier.

8. The method according to claim 7, wherein the initialization completion phase follows the initialization phase, and is performed once all of the plurality of software modules have notified the central software module that identifiers have been disclosed.

9. The method according to claim 7, wherein a software module of the plurality of software modules notifies the central software module in the initialization completion phase if the respective communications input is assigned an identifier that does not correspond to any communications input, or if the configuration list contains no entry that assigns an identifier to the communications input.

10. The method according to claim 7 comprising an operating phase, in which the communications input of a software module retrieves data from the communications output, wherein the data includes the assigned variable that has the assigned stored identifier.

11. The method according to claim 10, wherein data are retrieved cyclically for the plurality of software modules and/or at a request of a software module for the plurality of software modules.

12. The method according to claim 1, wherein a single one of the software modules, specifically an interface software module, provides an interface between the operating software and a hardware of the wind turbine, and the interface software module provides all hardware inputs as communications inputs and all hardware outputs as communications outputs.

13. A non-transitory computer-readable storage medium having stored thereon executed instructions which, when executed on a wind turbine controller, cause the wind turbine controller to perform the method according to claim 1.

14. The non-transitory computer-readable storage medium according to claim 13, wherein the wind turbine controller includes the non-transitory computer-readable storage medium.

15. The non-transitory computer-readable storage medium according to claim 14, wherein the wind turbine comprises a tower, a nacelle, and the wind turbine controller.

* * * * *